Aug. 26, 1969  D. ENGELSMANN ET AL  3,463,068
PHOTOGRAPHIC CAMERA WITH FLASH UNIT
Filed July 14, 1966  2 Sheets-Sheet 1

*INVENTOR.*
DIETER ENGELSMANN
DIETER MAAS
KARL BAMMESBERGER
HUBERT HACKENBERG

Michael S. Striker

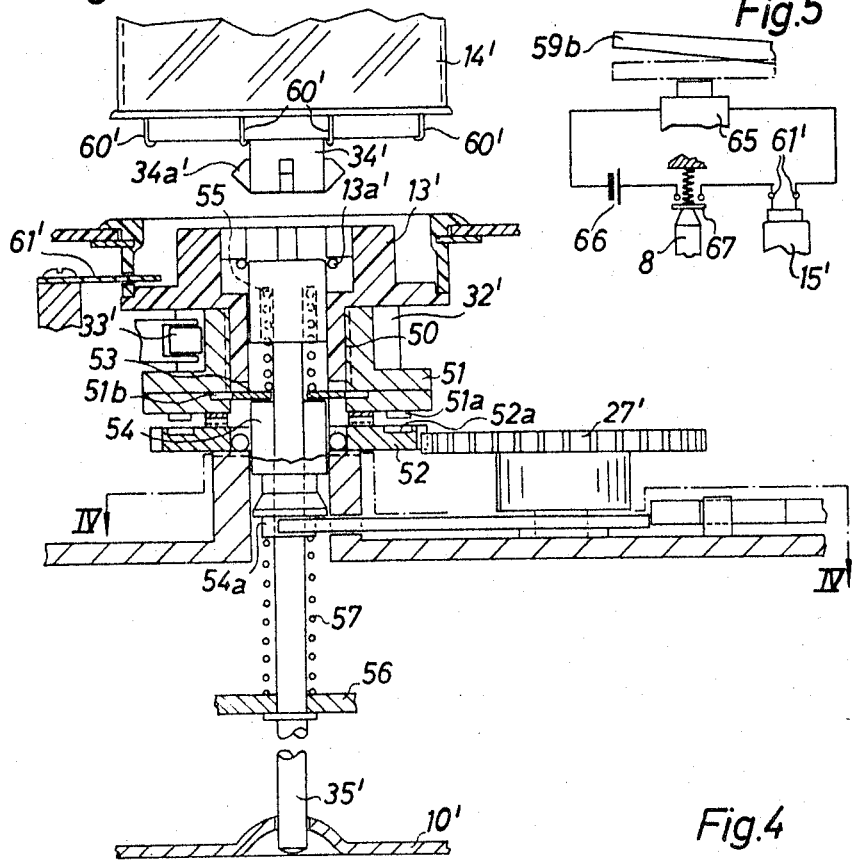

United States Patent Office 3,463,068
Patented Aug. 26, 1969

3,463,068
PHOTOGRAPHIC CAMERA WITH FLASH UNIT
Dieter Engelsmann, Unterhaching, Munich, Dieter Maas, Munich, Karl Bammesberger, Munich-Untermenzing, and Hubert Hackenberg, Munich-Solln, Germany, assignors to Agfa-Gevaert Aktiengesellschaft, Leverkusen, Germany
Filed July 14, 1966, Ser. No. 565,121
Claims priority, application Germany, Aug. 9, 1965, A 49,945
Int. Cl. G03b 9/70, 15/03
U.S. Cl. 95—11.5        18 Claims

ABSTRACT OF THE DISCLOSURE

A photographic camera with a built-in flash unit employing multiple flash bulb holders which are indexible to place successive bulbs into appropriate position for firing. The camera has a socket for supporting the multiple flash bulb holder, a device for actuating the camera, an indexing member for the camera socket, and a control element for the indexing member. The control element prevents the indexing member for the multiple flash bulb holder from indexing the holder prior to operation of the camera actuating device and subsequent to attachment of the holder to the camera socket. The control element also prevents operation of the indexing member when the holder is detached from the camera socket.

The present invention relates to photgraphic cameras, and more particularly to improvements in photographic cameras which are provided with a flash unit. Still more particularly, the invention relates to improvements in photographic cameras whose flash unit can utilize so-called "Flashcubes" or analogous multiple flash bulb holders which are detachably supported by the housing of the camera and are movable by an indexing mechanism so that each of a series of flash bulbs in the holder which is attached to the camera can be moved to a predetermined position for illumination of the subject in response to completion of the flash circuit in the course of the next exposure.

It is already known to provide a photographic camera with a flash unit whose multiple flash bulb holder can be rotated by an indexing mechanism which is operated by the film transporting mechanism so that a fresh flash bulb can be made to face the subject subsequent to each manipulation of the film transporting mechanism with a view to advance the film by the lentgh of a frame. In many instances, the indexing mechanism comprises a spring which is caused to store energy when the operator manipulates the film transporting mechanism and dissipates the thus stored energy in response to subsequent depression of the release trigger wheregy the holder is automatically turned through 90 degrees. Such spring-operated indexing mechanisms are not too satisfactory because the operator must exert a considerable force to manipulate the film transporting mechanism and because depression of the release trigger also requires some effort so that, when making an exposure, the user is likely to shake the camera. Also, the dissipation of energy by the spring produces readily discernible noise.

In accordance with a more recent proposal, the indexing mechanism is connected with the film transporting mechanism in such a way that it automatically changes the angular position of the multiple flash bulb holder when the film transporting mechanism is manipulated for the purpose of advancing the film by the length of a frame. A serious drawback of each of the above outlined prior proposals is that the holder is rotated automatically in response to each manipulation of the film transporting mechanism and/or in response to each depression of the release trigger. This is undesirable when a freshly inserted holder contains one or more spent flash bulbs because it can happen that, in manipulating the film transporting mechanism or in depressing the release trigger, the operator will move an unexpanded flash bulb from requisite position for illumination of the subject and will simultaneously place a spent bulb into such position. This will happen without fail if the freshly inserted holder contains a single unexpended flash bulb and is attached to the camera in such a way that the unexpended bulb faces the subject prior to manipulation of the film transporting mechanism or prior to renewed depression of the trigger. Such manipulation or depression will then cause the single unexpended flash bulb to move away from requisite position and to give room to a spent bulb. This will be readily understood by assuming that the holder is rotatable by the film transporting mechanism and by also assuming that a holder containing a single satisfactory bulb is inserted subsequent to making an exposure in daylight, prior to subsequent manipulation of the film transporting mechanism, and in such a way that the single unexpended bulb faces the subject when the objective is trained upon the subject. In order to be able to make an exposure, the operator of the camera must manipulate the film transporting mechanism, and such manipulation will cause angular displacement of the holder. The situation is not better if the holder contains spent bulbs which alternate with unexpended bulbs.

Accordingly, it is an important object of the present invention to provide a photographic camera whose flash unit can utilize detachable multiple flash bulb holders and which is constructed and assembled in such a way that a flash bulb which is ready to face the subject in response to attachment of the holder to the camera will remain in such position until and unless the operator has caused discharge by such bulb by making an exposure with flash so that, by attaching the holder in a position in which an unexpended flash bulb faces the subject, the operator knows that the unexpended bulb will not change its position in response to manipulation of the film transporting mechanism prior to making an exposure with flash.

Another object of the invention is to provide the camera with a novel indexing mechanism for the multiple flash bulb holder, with a novel operative connection between such indexing mechanism and the film transporting mechanism, and with novel means for preventing opeartion of the indexing mechanism when the holder is detached from the camera so that the indexing mechanism is not subjected to unnecessary wear when the operator does not wish to make exposures with flash.

A further object of the invention is to provide a camera of the just outlined characteristics whose flash unit can utilize readily available multiple flash bulb holders.

Briefly stated, one feature of the present invention resides in the provision of a photographic camera, preferably a still camera, which comprises a support normally constituted by the housing of the camera, a multiple flash bulb holder (preferably a "Flashcube") having a plurality of flash bulbs and being detachably carried by the support for movement between a plurality of successive positions in each of which one of its flash bulbs faces in a predetermined direction (when the holder is a "Flashcube," it is rotatable with reference to the support and the flash bulb which faces in such predetermined direction is in an optimum position to illuminate the subject when the objective of the camera is trained upon the subject), an electric flash circuit which comprises first contact means carried by the support and separate second contact means for each flash bulb whereby the frst contact means is energized by one of the second contact means when the respective flash bulb faces in the aforementioned predetermined direction, a release trigger or analogous means for completing the flash circuit during an exposure to set off a flash by effecting discharge of the flash bulb facing in the predetermined direction, indexing means operative to move the holder between successive positions, drive means preferably including a film transporting mechanism for operating the indexing means to move the holder between two successive positions in response to manipulation of the transporting mechanism for the purpose of advancing the film by the length of a frame, and control means for automatically preventing operation of the indexing means prior to completion of an exposure with flash. Such control means may comprise a control member in the form of a rockable lever or a reciprocable shuttle which is movable between a first position in which it prevents operation of the indexing means and a second position in which the control means permits operation of the indexing means by the film transporting mechanism.

The control member can be moved to or maintained in its first position by a blocking member which is provided in the camera to prevent double exposure of film frames and which can be moved to an inoperative position in response to release of the shutter. Thus, the blocking member can prevent operation of the indexing means when the holder is attached to the support upon completion of an exposure but prior to the next-following manipulation of the film transporting mechanism.

In accordance with another feature of the present invention, the control member is biased by a suitable spring which tends to move it to a second position when the control member is not held in its first position by the aforementioned blocking member. The camera is then preferably provided with a push rod or analogous means for preventing movement of the control member to second position when the holder is detached from the support so that the indexing means is automatically prevented from operating in response to manipulation of the film transporting mechanism.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 3 is a fragmentary vertical section through a modified camera;

FIG. 4 is a section substantially as seen in the direction of arrows from the line IV—IV of FIG. 3; and FIG. 5 illustrates certain details of a third camera constituting a modification of the camera shown in FIGS. 3 and 4.

Figure 1:
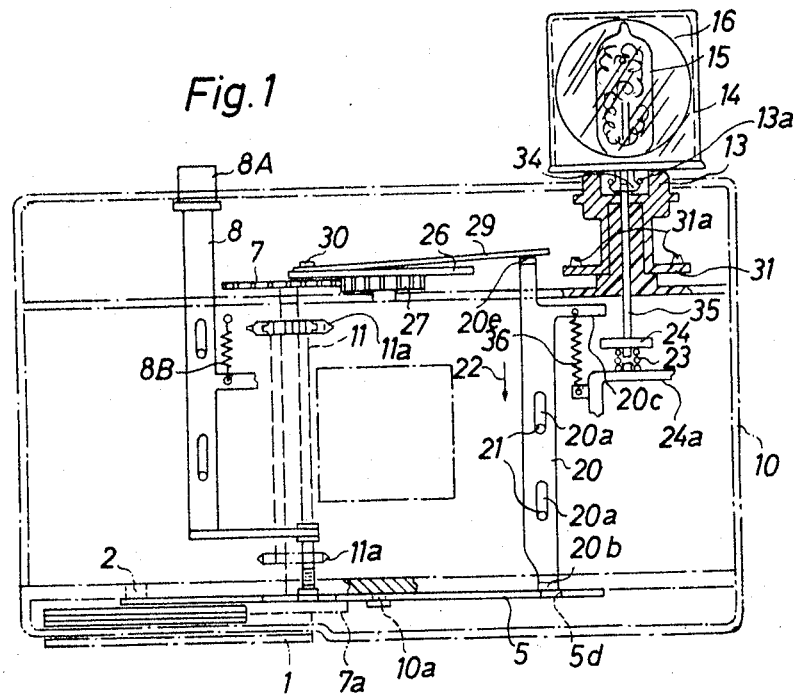
FIG. 1 is a diagrammatic elevational view of a still camera which embodies one form of our invention, the housing of the camera being indicated by phantom lines and certain parts of various mechanisms in the housing being shown in section.
Figure 2:
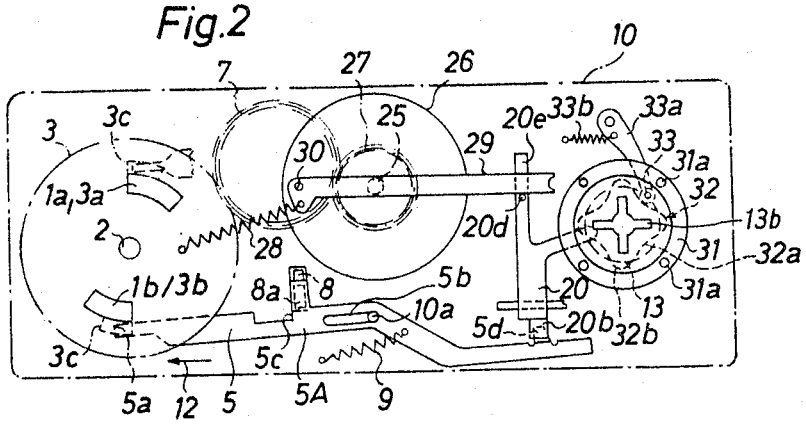
FIG. 2 is a top plan view of the structure shown in FIG. 1, the multiple flash bulb holder and the upper wall of the hosuing being removed.

Referring first to FIGS. 1 and 2, there is shown a still camera which comprises a housing 10 constituting the main support for all of the parts which will be described hereinafter. The camera further comprises a film transporting mechanism including a manually operable actuating lever 1 which is provided at the underside of the housing 10 and is rockable about the axis of a vertical shaft 2. The shaft 2 is journalled in the bottom wall of the housing 10 and the actuating lever 1 comprises two downwardly extending motion transmitting projections or lugs 1a, 1b each of which has a vertical face and a sloping face. The lugs 1a, 1b cooperate with complementary projections or lugs 3a, 3b provided on a gear 3 which is rotatable on and is also movable axially of the shaft 2. The aforementioned vertical faces on the lugs 1a, 1b enable the lever 1 to rotate the gear 3 when the lever is rocked in one direction but not when the lever is rocked in the opposite direction. A suitable return spring (not shown) urges the actuating lever 1 to rotate in a direction in which the lugs 1a, 1b do not entrain the gear 3, i.e., the lever 1 automatically returns to an idle position as soon as it is released by the operator's fingers.

The camera further comprises a reciprocable release trigger 8 which has a knob or head 8A extending upwardly and beyond the top wall of the housing 10. This release trigger 8 has an inclined projection or lug 8a which can cooperate with a blocking member 5 here shown as a two-armed lever which prevents double exposure of any given film frame and which also regulates the operation of a control unit serving to prevent, under certain circumstances, the operation of an indexing mechanism which will be described hereinafter. The blocking lever 5 constitutes an operative connection between the gear 3 of the film supporting mechanism and the release trigger 8 and is formed with an elongated slot 5b receiving a pivot pin 10a which is fixed to the bottom wall of the housing 10 and allows the blocking lever to perform angular as well as translatory movements. A helical spring 9 tends to rock the blocking lever 5 in a clockwise direction, as viewed in FIG. 2, and to simultaneously shift the blocking lever in a direction to the left so that the upwardly inclined resiline end portion 5a of the blocking lever bears against the underside of the gear 3. This gear is located at a level below the lugs 1a, 1b of the actuating lever 1 so that the resilient end portion 5a of the blocking lever 5 urges the gear 3 against the actuating lever. When the actuating lever 1 is rotated by the operator against the action of the aforementioned return spring, its lugs 1a, 1b entrain the gear 3 whereby the gear drives a pinion 7a provided at the lower end of a shaft 11 carrying two sprockets 11a and a further pinion 7. The teeth of the sprockets 11a extend into the perforations of the film (not shown) so that the film can be transported by the length of a frame in response to each manipulation of the lever 1.

When the actuating lever 1 is rotated by hand through 180 degrees, one of the lugs 3a, 3b on the gear 3 engages the end portion 5a of the blocking lever 5 and shifts the latter with reference to the pin 10a against the opposition of the spring 9 to the extent determined by the length of the slot 5b. A stop portion 5A of the blocking lever 5 then moves out of the path of the lug 8a so that the trigger 8 can be depressed against the opposition of a return spring 8B. The lug 8 then bypasses a shoulder 5c bounding one end of the stop portion 5A on the blocking lever. In other words, the blocking lever 5 allows depression of the trigger 8 only when the film has been transported by the actuating lever 1 so that an unexposed film frame is in proper position for illumination during the next exposure. A retaining member enters one of two recesses 3c in the gear 3 shortly before the actuating lever 1 has been rotated through full 180 degrees to hold the gear 3 against rotation in the opposite direction. When the actuating lever 1 thereupon returns to its normal position under the bias of the aforementioned return spring, the sloping faces of its lugs 1a, 1b shift the gear 3 axially downwardly along the axis of the shaft 2 and the lugs 3a, 3b thereupon snap behind the vertical faces of the lugs 1a, 1b to make sure that the gear 3 is rotated again during the next manipulation of the actuating lever. The end portion 5a of the blocking lever 5 is then located in front of one of the lugs 3a, 3b so that the film transporting mechanism cannot be operated twice without making an exposure between two successive manipulations. Thus, the blocking lever 5 constitutes a very simple and effective means for preventing double exposure of the same film frame. The end portion 5a will move from the path of the lug 3a or 3b in response to depression of the head 8A on the release trigger 8 (in a direction at right angles to the plane of FIG. 2) because the inclined lug 8a of the trigger then engages the shoulder 5c and shifts the blocking lever 5 against the opposition of the spring 9. The blocking lever 5 is simultaneously rocked about the pin 10a in a clockwise direction, as viewed in FIG. 2, so that the spring 9 is again free to contract and to move the lever 5 in the direction of the arrow 12. However, the end portion 5a now abuts against the outer side of the lug 3a or 3b and cannot impede rotation of the gear 3 in response to renewed manipulation of the actuating lever 1. When the trigger 8 is released and moves back to starting position under the bias of its return spring 8B, the spring 9 moves the blocking lever 5 still further in a direction to the left (arrow 12 in FIG. 2) so that the shoulder 5c moves below the release trigger and the aforementioned stop portion 5A prevents renewed depression of the trigger prior to manipulation of the film transporting mechanism. Such position of the blocking lever 5 is shown in FIG. 2. Thus, the blocking lever 5 prevents dual exposure of film frames by impeding repeated actuation of the film transporting mechanism and this blocking lever also prevents depression of the release trigger 8 prior to actuation of the film transporting mechanism subsequent to completion of an exposure. The shutter which opens and then closes in response to depression of the release trigger 8 is well known in the art and is not shown in the drawings.

The top wall of the housing 10 is formed with a suitable recess which accommodates a rotary female coupling member or socket 13 which forms part of the indexing mechanism for a multiple flash bulb holder 14 and whose top face has a preferably cruciform cavity 13b adapted to receive the male coupling member or plug 34 of the holder 14, the latter constituting a so-called "Flashcube" having four reflectors 16 each located behind a flash bulb 15. The indexing mechanism including the socket 13 can rotate the holder 14 through 90 degrees in response to manipulation of the film transporting mechanism so as to place a fresh flash bulb 15 into a predetermined optimum position for illumination of a subject. In accordance with the present invention, the indexing mechanism is operative only upon completion of an exposure with flash and the holder 14 cannot be rotated during the first manipulation of the film transporting mechanism subsequent to insertion of the plug 34 into the socket 13. This is a very important feature of the present invention because, by knowing that the holder 14 will not be rotated if its plug 34 has been coupled to the socket 13 subsequent to depression of the release trigger 8, the operator can immediately insert the plug 34 in such position that a fresh (unexpended) flash bulb 15 faces the subject. In other words, the indexing mechanism will not rotate the holder 14 during the first manipulation of the film transporting mechanism if the plug 34 has been coupled to the socket 13 during the interval following the last depression of the release trigger 8 but preceding the next-following manipulation of the film transporting mechanism. In accordance with another advantageous feature of the invention, the indexing mechanism is idle when the plug 34 is detached from the socket 13 so that the socket need not be rotated when the holder 14 is detached. This reduces the wear on the indexing mechanism and insures the plug 34 of a holder 14 can be immediately inserted in such angular position of the holder 14 in which a flash bulb 15 faces the subject. When a flash bulb 15 is in requisite position with reference to the subject, the axis of the corresponding reflector 16 is preferably parallel to the optical axis of the objective.

The importance of the just described features of the improved camera will be readily appreciated by considering that the user of the camera might decide to attach to the housing 10 a holder 14 which contains one, two or even three spent flash bulbs 15. By knowing that the holder 14 will not be rotated, excepting upon an exposure with flash, the user can immediately insert the plug 34 of a partially expended holder 14 in such a way that an unexpended flash bulb faces the subject. Otherwise, and if the socket 13 were rotated in response to each manipulation of the film transporting mechanism (lever 1), it could happen that a fresh flash bulb which has faced the subject upon insertion of the plug 34 into the socket 13 would be caused to change its angular position and that an expended flash bulb would face the subject during the next exposure. However, and since the camera is constructed in such a way that the holder 14 is rotated through 90 degrees only upon completion of an exposure with flash, the user of the camera must only exercise care during insertion of the plug 34 to make sure that an unexpended flash bulb faces the subject when a holder containing one, two or three spent flash bulbs 15 is attached to the socket 13.

As explained hereinabove, movements of the blocking lever 5 are controlled by the film transporting mechanism (gear 3) on the one hand and by the release trigger 8 (projection 8a) on the other hand. The control means for disengaging the indexing mechanism from the film transporting mechanism (i.e., for preventing rotation of the socket 13) when the holder 14 is detached or when the film transporting mechanism is manipulated subsequent to attachment of the holder 14 but prior to making an exposure with flash comprises a reciprocable control member 20 (hereinafter called shuttle) which is provided with vertical guide slots 20a receiving stationary pins 21 fixed to the housing 10. The shuttle 20 is biased downwardly, as viewed in FIG. 1, by a helical contraction spring 36, see the arrow 22. Its lower end portion 20b abuts against a projection or lug 5d on the right-hand arm of the blocking lever 5 when the latter is moved to its left-hand end position in which the stop portion 5A prevents depression of the release trigger 8 because the lever 1 was not manipulated following the last exposure. When the spring 36 is held against contraction because the lower end portion 20b of the shuttle 20 abuts against the lug 5d, the plug 34 of a holder 14 is either disconnected from the socket 13 or the plug 34 has been inserted subsequent to making an exposure in daylight but prior to first manipulation of the film transporting mechanism subsequent to completion of such exposure. When the holder 14 is detached from the socket 13, a push rod 35 whose upper end normally extends into the cruciform cavity 13b of the socket 13 is held in its upper end position by a helical expansion spring 23 operating between a fixed bracket 24a and a head 24 at the lower end of the push rod 35. The head 24 then bears against a projection 20c provided to the upper end of the shuttle 20 and maintains the latter in the upper end position. When the holder 14 is connected to the socket 13, its plug 34 depresses the push rod 35 against the opposition of the spring 23 so that the head 24 moves downwardly and away from the projection 20c. The shuttle 20 is then free to move downwardly provided, of course, that such movement is not obstructed by the lug 5d of the blocking lever 5. In other words, even if the holder 14 is properly attached to housing 10, the shuttle 20 can still be held in its operative upper end position in which the indexing mechanism is prevented from rotating the socket 13. The indexing mechanism will be operatively connected with the film transporting mechanism only if, upon completed attachment of the holder 14 to the socket 13, the operator has rotated the lever 1 in a sense to advance the film by the length of a frame, it being assumed that the holder was attached upon completion of an exposure but prior to a manipulation of the lever 1 after such exposure.

The indexing mechanism includes the aforementioned socket 13 which is rotatable in the housing 10 but cannot move axially, and a driver wheel 26 which is rotatable about the axis of a shaft 25 and is coaxially affixed to a gear 27 meshing with the pinion 7 at the upper end of the shaft 11. The driver wheel 26 carries an eccentric pivot pin 30 for an elongated motion transmitting pawl 29 which is biased by a helical spring 28 so that it invariably tends to turn in a clockwise direction, as viewed in FIG. 2. An intermediate portion of the pawl 29 (which latter is preferably a leaf spring) bears against a guide pin 20d on a platform or ledge 20e provided at the upper end of thte shuttle 20. The right-hand end portion of the pawl 29 can engage one of four projections or studs 31a provided on a ratchet wheel 31 which is coaxial with and is affixed to the socket 13. As clearly shown in FIG. 1, the right-hand end portion of the pawl 29 is moved to a level above the common plane of the studs 31a when the shuttle 20 is held in the upper end position, i.e., when the lower end portion 20b of the shuttle is held in abutment with the upper side of the lug 5d on the blocking lever 5. Therefore, rotation of the driver wheel 26 in response to manipulation of the film transporting mechanism and resulting rightward movement of the pawl 29 cannot result in an angular displacement of the socket 13 and the holder 14 is held against rotation. The pawl 29 is invariably disengaged from the ratchet wheel 31 when the plug 34 is withdrawn from the socket 13 because the push rod 35 is then moved upwardly by its spring 23 and the head 24 of this push rod maintains the shuttle 20 in the upper end position in which the platform 20e holds the right-hand end portion of the pawl 29 at a level above the plane of the studs 31a.

The camera is further provided with a detent device serving to hold the socket 13 in such angular positions in which one flash bulb 15 of a properly attached holder 14 automatically faces the subject, namely, in which the axis of one of the reflectors 16 is parallel with the optical axis of the objective. This detent device comprises a cam 32 which is affixed to the socket 13 and has four equidistant lobes 32b separated by concave notches 32a. A follower wheel 33, mounted on an arm 33a which is rockable in the housing 10 and is biased by a helical spring 33b, tracks the peripheral surface of the cam 32 and automatically enters the deepmost zone of a notch 32a when the socket 13 is brought to a halt. Thus, by turning the socket 13 through 90 degrees, the pawl 29 must engage and turn one of the studs 31a with a force which is sufficient to overcome the bias of the spring 33b so that the follower 33 will ride over one of the lobes 32b and then enters the deepmost zone of the next-following notch 32a.

The operation of the camera is as follows:

If the operator decides to attach a multiple flash bulb holder 14, the plug 34 of such holder is introduced into the cruciform recess 13b in the top face of the socket whereby the radially outwardly extending teeth of the plug 34 are caused to expand a suitable retaining spring 13a. The spring 13a then snaps behind the teeth on the plug 34 and prevents uncontrolled detachment of the holder 14. The properly inserted plug 34 shifts the push rod 35 downwardly so that the spring 23 is compressed by the head 24. At the same time, the head 24 moves downwardly and away from the projection 20c of the shuttle 20 so that the latter would be free to follow the bias of the spring 36 if its lower end portion 20b were free to bypass the lug 5d of the blocking lever 5. This means that the shuttle 20 remains in the upper end position of FIG. 1 even if the holder 14 has been attached subsequent to depression of the release trigger 8 but prior to manipulation of the film transporting mechanism (lever 1). The right-hand end portion of the pawl 29 remains in raised or deformed position and, when the film transporting mechanism is manipulated, the pawl 29 simply travels at a level above the plane of the studs 31a on the ratchet wheel 31 so that the socket 13 is not rotated and a flash bulb 15 which has faced the subject upon completed insertion of the plug 34 remains in such angular position. In other words, and as already mentioned hereinabove, the socket 13 cannot be rotated if the holder 14 has been attached thereto subsequent to depression of the release trigger 8 but prior to manipulation of the film transporting mechanism following the completion of an exposure.

During the next-following manipulation of the film transporting mechanism, the projection 5d of the blocking lever 5 is moved from the path of the end portion 20b in a manner as fully described hereinbefore so that the spring 36 is free to contract and moves the shuttle 20 downwardly (arrow 22) whereby the platform 20e of the shuttle allows the pawl 29 to move into the plane of the studs 31a. The camera is now ready to make an exposure with flash and, when the film transporting mechanism is manipulated subsequent to completion of such exposure with flash, the pawl 29 entrains one of the studs 31a and rotates the ratchet wheel 31 with the socket 13 and holder 14 through 90 degrees (in a clockwise direction, as viewed in FIG. 2). During such rotation of the ratchet wheel 31, the pawl 29 bears against the guide pin 20d of the platform 20e because it is permanently biased by the helical spring 28 which tends to rock the pawl in a clockwise direction.

If the holder 14 is thereupon detached from the socket 13, the push rod 35 is moved upwardly by the spring 23 and its head 24 lifts the projection 20c so that the shuttle 20 returns to the upper end position and moves the pawl 29 into the position shown in FIG. 1 whereby the socket 13 remains in its angular position even if the operator turns the actuating lever 1 in order to advance the film subsequent to each exposure in daylight. The blocking lever 5 will not prevent contraction of the spring 36 if the holder 14 is inserted subsequent to completion of an exposure and subsetquent to manipulation of the lever 1 after such exposure. The next exposure is then made with flash as soon as the operator decides to depress the trigger 8.

It is clear that the camera of FIG. 1 is susceptible of many modifications without departing from the spirit of the present invention. For example, the actuating lever 1 may be installed adjacent to the top wall of the housing 10. The pinion 7a is then omitted because the gear 3 can mesh directly with the pinion 7 at the upper end of the shaft 11 for the sprockets 11a. Also, the actuating lever 1 may be installed in a position somewhere between the top and bottom walls of the housing 10.

The socket 13 may be installed in a customary foot which is insertable into and withdrawable from a conventional accessory shoe provided on the top wall of the housing 10. In other words, the holder 14 may be detached from the socket 13 and the socket 13 may be detached from the housing 10. In such modified constructions, the socket 13 is not rotated when the holder 14 is detached therefrom or when the holder is connected with such separable socket subsequent to completion of an exposure but prior to the next-following manipulation of the film transporting mechanism. Since a multiple flash holder is normally connected with the socket 13 only when it contains at least one unexpended flash bulb 15, and since a careful operator invariably attaches the flash bulb holder in such a way that an unexpended flash bulb faces the subject, the aforementioned feature that the socket 13 is not rotated subsequent to attachment of a holder 14 and in response to first manipulation of the film transporting mechanism following an exposure without flash, the operator knows that a fresh flash bulb is properly connected in the flash circuit during the next-following depression of the release trigger 8.

The pawl 29 and the ratchet wheel 31 can be said to constitute a very simple clutch and the shuttle 20 constitutes a control member or shifter which can disengage the clutch elements 29, 31 in automatic response to detachment of the holder 14 from the socket 13 and also during the first manipulation of the film transporting mechanism following the depression of the release trigger 8 if the holder 14 is attached in the interval between such depression but prior to next-following manipulation of the film transporting mechanism.

FIGS. 3 and 4 illustrate a portion of a modified camera. All such component parts of this modified camera which are clearly analogous to the corresponding parts of the previously described camera are identified by similar reference numerals, each followed by a prime. The socket 13' is rotatable with reference to but cannot move axially in the housing 10'. The teeth on the plug 34' are shown at 34a', and such teeth expand the retaining spring 13a' when the plug 34' is introduced into the recess of the socket 13'. The spring 13a' then contracts and holds the plug 34' with a relatively small force so that the multiple flash bulb holder 14' cannot be accidentally detached from the housing 10'.

The clutch 29, 31 of FIGS. 1 and 2 is replaced by a simple claw clutch including a composite disk 51 forming part of a first clutch element and coupled with the socket 13'. The disk 51 is preferably composed of two parts for convenient manufacture and is movable axially in guides 50 provided in an axial bore of the socket 13' but cannot rotate with respect to the socket. The other clutch element is a gear 52 whose top face is provided with recesses 52a adapted to receive downwardly extending claws 51a of the disk 51. The gear 52 meshes with the gear 27' which latter, in turn, can be rotated in response to manipulation of the film transporting mechanism in the same way as described in connection with FIGS. 1 and 2. The upper face of the lower half of the disk 51 is formed with a slot 51b which receives suitable inwardly extending projections of a motion transmitting plate 53. The plate 53 also forms part of the first clutch element and is biased downwardly by a helical clutch spring 55 which can be compressed by a head at the upper end of the push rod 35'. Such downward movement of the plate 53 is possible only when a control cam 54 is released by the arm 59b of a two-armed control lever 59 best shown in FIG. 4. The control cam 54 is movable axially of the socket 13' and is biased upwardly by a helical spring 57 which surrounds the push rod 35' and whose lowermost convolution bears against a fixed retainer 56. The push rod 35' can move axially with reference to the control cam 54 and its lower end portion extends through a suitable aperture in the bottom wall of the housing 10'.

The control lever 59 is mounted on a vertical shaft 58 which carries the gear 27' of the indexing mechanism. This lever 59 is biased by a spring 60 which tends to maintain its arm 59a in abutment with the left-hand end portion of the blocking lever 5'. The arm 59b of the control lever 59 normally bears against an annular face 54a provided below an annular shoulder of the control cam 54. The blocking lever 5' assumes the position shown in FIG. 4 subsequent to depression of the release trigger 8 (not shown) but prior to manipulation of the film transporting mechanism. During the next-following manipulation of the film transporting mechanism, the blocking lever 5' is shifted in the direction indicated by an arrow 61 whereby the arm 59b of the control lever 59 moves away from the face 54a of the control cam 54 (by rotating in a counterclockwise direction, as viewed in FIG. 4). If the user then decides to introduce the plug 34' of a holder 14' into the socket 13', the push rod 35' is caused to move downwardly and the spring 55 biases the plate 53 downwardly. The plate 53 moves with the disk 51 so that the claws 51a enter the recesses 52a of the gear 52. As the disk 51 moves downwardly, the plate 53 shifts the control cam 54 against the opposition of the spring 57. If the release trigger is thereupon depressed, the camera will make an exposure with flash. During the next manipulation of the film transporting mechanism, the gear 27' rotates the gear 52 and the latter rotates the disk 51, socket 13' and holder 14' through the intermediary of the claws 51a. The transmission ratio of the indexing mechanism including the parts 27', 53, 52, 51, 13' is such that the holder 14' is rotated through exactly 90 degrees in response to each manipulation of the film transporting mechanism.

If the plug 34' of a holder 14' is attached to the socket 13' when the indexing mechanism assumes the position shown in FIGS. 3 and 4, namely, subsequent to depression of the release trigger but prior to the next-following manipulation of the film transporting mechanism, the push rod 35' again moves downwardly because its head is depressed by the plug 34'. The descending push rod 35' compresses the spring 55. However, since the arm 59b of the control lever 59 bears against the face 54a of the control cam 54, the latter is held against downward movement so that the plate 53 cannot yield to the bias of of the spring 55 and the disk 51 remains disengaged from thet gear 52. If the used thereupon manipulates the film transporting mechanism, the blocking lever 5' moves in the direction indicated by the arrow 61 and the control lever 59 is rocked to move the arm 59b away from the face 54a so that the control cam 54 descends under the bias of the spring 55 and the claws 51a of the disk 51 enter the recesses 52a of the gear 52. The operative connection between the film transporting and indexing mechanisms is now restored and the socket 13' will be rotated through 90 degrees in response to each subsequent manipulation of the film transporting mechanism. Here, again a flash bulb which faces the subject on insertion of the plug 34' into the socket 13' will remain in such position during manipulation of the film transporting mechanism subsequent to making of an exposure if the holder 14' is attached to the socket 13' subsequent to depression of the release trigger but prior to next-following manipulation of the film transporting mechanism. In other words, by inserting the plug 34' in such a way that an unexpended flash bulb of the holder 14' faces the subject, the operator knows that the unexpended flash bulb will remain in such position until after completion of an exposure with flash and that another flash bulb will be automatically placed in an optimum position for illumination of the subject if the film transporting mechanism is manipulated subsequent to such exposure with flash. When the operator has completed an exposure with flash and thereupon manipulates the film transporting mechanism, the clutch including the parts 51–53 remains operative because the arm 59b of the control lever 59 cannot move below the face 54a of the control cam 54, i.e., the latter remains in its lower end position so that the claws 51a remain in the respective recesses 52a.

The push rod 35' serves as a simple ejector in that it will expel the plug 34' of a spent holder 14' in response to manual pressure against its lower end portion which extends beyond the bottom wall of the housing 10'.

FIG. 3 shows that the base 14a' of the holder 14' is provided with four pairs of electric contacts 60', one pair for each of its flash bulbs. The contacts 60' of that flash bulb which faces the subject are then in engagement with complementary contacts 61' (only one shown) provided in the housing 10'. This means that one of the flash bulbs is connected into the flash circuit which includes the contracts 61' and the camera will make an exposure with flash in response to depression of the release trigger. This trigger then closes a conventional synchronizing switch of the flash circuit which also contains a suitable source of electrical energy, for example, one or more batteries which are not shown in the drawings. In other words, the flash circuit including the fixed contacts 61' can be completed only when an unexpended flash bulb faces the subject.

This inventon can be embodied with equal advantage in photographic cameras wherein the control member (20 or 59) for the clutch (29, 31 or 51–53) is controlled by a device other than the blocking lever 5 or 5'. For example, the flash circuit of the camera can comprise an electromagnet which will bring about engagement of the clutch elements in the indexing mechanism in response to completion of the flash circuit, i.e., in response to completion of an exposure with flash. This will be readily understood by referring to FIG. 5 wherein the blocking lever 5' is replaced by an electromagnet 65 which will attract the arm 59b of the control lever 59 to disengage this arm from the face 54a in response to completion of the flash circuit.

The flash circuit of FIG. 5 comprises a battery 66, a synchronizing switch 67, and the fixed contacts 61'. The switch 67 can be closed by the release trigger 8. It will be seen that the flash circuit is completed only when the gap between the fixed contacts 61' is bridged by an unexpended flash bulb 15', i.e., when the contacts 61' are engaged by the contacts 60' of an unexpended bulb. In other words, the detent means or the indexing mechanism must maintain the holder 14 or 14' in one of a series of successive positions which are spaced apart by 90 degrees and in each of which the follower 33 (FIG. 1) or 33' (FIG. 3) extends into the deepmost zone of a notch in the cam 32 or 32'.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a photographic camera, a support; a holder having a plurality of flash bulbs and first contact means for each of said flash bulbs, said holder being detachably carried by and being movable with reference to said support between a plurality of successive positions in each of which one of said flash bulbs faces in a predetermined direction; a flash circuit including second contact means carried by said support and being engaged by one of said first contact means when the respective flash bulb faces in said predetermined direction; circuit completing means operative to complete the flash circuit during an exposure to set off a flash by effecting discharge of the flash bulb facing in said predetermined direction; indexing means actuatable to move said holder between said successive positions; drive means including a film transporting mechanism for actuating said indexing means only upon attachment of the holder to said support and subsequent to operation of said circuit completing means; and control means for preventing actuation of said indexing means by said film transporting mechanism when said holder is detached from said support and prior to operation of said circuit completing means subsequent to attachment of the holder to said support.

2. A structure as set forth in claim 1, wherein said support constitutes the housing of the camera and said housing comprises a top wall and a bottom wall, said film transporting mechanism including an actuating lever rockably mounted adjacent to said bottom wall, a shaft rotatable by said lever and extending toward said top wall, and a gear provided on said shaft adjacent to said top wall, said indexing means comprising a rotary socket mounted on said top wall and detachably supporting said holder.

3. A structure as set forth in claim 1, wherein said control means comprises electromagnet means energizable in response to completion of said flash circuit by said circuit completing means to thereby establish a motion transmitting connection between said film transporting mechanism and said holder through the intermediary of said indexing means.

4. A structure as set forth in claim 1, wherein said indexing means comprises a clutch including a first clutch element for transmitting motion to said holder and a second clutch element receiving motion from said drive means, one of said clutch elements being movable into and from engagement with the other clutch element, said control means comprising a control member mounted in said support and movable between a first position to disengage said one clutch element from said other clutch element and a second position in which the clutch is free to move said holder between successive positions in response to manipulation of said drive means, and biasing means for permanently urging said control member to second position, and further comprising a device for moving said control member to first position in response to detachment of said holder from said support.

5. A structure as set forth in claim 1, wherein said indexing means comprises a socket rotatably mounted in said support and said holder comprises a plug detachably received in said socket, said holder being rotatable through 90 degrees between said successive positions thereof.

6. A structure as set forth in claim 1, wherein said indexing means comprises a clutch having two separable clutch elements one of which is arranged to transmit motion to said holder and the other of which receives motion from said drive means, said control means comprising a control member for separating said clutch elements prior to completion of an exposure with flash.

7. A structure as set forth in claim 6, wherein said control means also comprises biasing means for permanently urging said control member to a position in which said clutch elements are free to establish a driving connection between said drive means and said indexing means, and further comprising means for opposing movement of said control member under the action of said biasing means in response to detachment of said holder from said support.

8. A structure as set forth in claim 1, wherein said indexing means comprises a ratchet wheel arranged to rotate said holder and a pawl movable by said mechanism, said control means comprising a control member for disengaging said pawl from said ratchet wheel.

9. A structure as set forth in claim 8, wherein said control member is a reciprocable shuttle mounted in said support and arranged to move said pawl away from engagement with said ratchet wheel.

10. In a photographic camera, a support; a holder having a plurality of flash bulbs and first contact means for each of said flash bulbs, said holder being detachably carried by and being movable with reference to said support between a plurality of successive positions in each of which one of said bulbs faces in a predetermined direction; a flash circuit including second contact means carried by said support and being engaged by one of said first contact means when the respective bulb faces in said predetermined direction; means for completing the flash circuit during an exposure to set off a flash by effecting discharge of the bulb facing in said predetermined direction; indexing means operative to move said holder between said successive positions; drive means including a film transporting mechanism for operating said indexing means; control means for preventing operation of said indexing means prior to setting off of a flash, said indexing means being arranged to move said holder between two successive positions in response to manipulation of said film transporting mechanism to advance the film by the length of a frame when the operation of said indexing means is not prevented by said control means and said control means being arranged to automatically prevent operation of said indexing means in response to detachment of said holder from said support, said control means comprising a control member movable between a first position in which it prevents operation of said indexing means and a second position in which said indexing means is operated in response to motion transmitted by said drive means, and means for moving said control member to first position in response to detachment of said holder from said support; and blocking means for preventing double exposure of film frames, said blocking means being movable between a blocking position to thereby prevent manipulation of said film transporting mechanism and to simultaneously permit movement of said control member to second position, and a further position in which said mechanism can be manipulated to operate said indexing means and in which said control member is held against movement from said first position.

11. In a photographic camera, a support; a holder having a plurality of flash bulbs and first contact means for each of said flash bulbs, said holder being detachably carried by and being movable with reference to said support between a plurality of successive positions in each of which one of said bulbs faces in a predetermined direction; a flash circuit including second contact means carried by said support and being engaged by one of said first contact means when the respective bulb faces in said predetermined direction; means for completing the flash circuit during an exposure to set off a flash by effecting discharge of the bulb facing in said predetermined direction; indexing means operative to move said holder between said successive positions; drive means including a film transporting mechanism for operating said indexing means, said indexing means comprising a clutch having two separable clutch elements one of which is arranged to transmit motion to said holder and the other of which receives motion from said drive means and said indexing means being operative to move said holder between two successive positions in response to manipulation of said mechanism to advance the film by the length of a frame; control means for preventing operation of said indexing means prior to setting off of a flash, said control means comprising a control member for separating said clutch elements prior to completion of an exposure with flash, and biasing means for permanently urging said control member to a position in which said clutch elements are free to establish a driving connection between said drive means and said indexing means; means for opposing movement of said control member under the action of said biasing means in response to detachment of said holder from said support; blocking means movable between an operative position for preventing repeated manipulation of said film transporting mechanism subsequent to completion of an exposure and an inoperative position; and means for permanently urging said blocking means to operative position, said circuit completing means being arranged to move said blocking means to inoperative position in response to completion of an exposure and said blocking means comprising a portion arranged to prevent movement of said control member from said position thereof in response to attachment of said holder to said support and while said blocking means remains in operative position.

12. In a photographic camera, a support; a holder having a plurality of flash bulbs and first contact means for each of said flash bulbs, said holder being detachably carried by and being movable with reference to said support between a plurality of successive positions in each of which one of said bulbs faces in a predetermined direction; a flash circuit including second contact means carried by said support and being engaged by one of said first contact means when the respective bulb faces in said predetermined direction; means for completing the flash circuit during an exposure to set off a flash by effecting discharge of the bulb facing in said predetermined direction; indexing means operative to move said holder between said successive positions; drive means for operating said indexing means, said indexing means comprising a clutch including a first clutch element for transmitting motion to said holder and a second clutch element receiving motion from said drive means, one of said clutch elements being movable into and from engagement with the other clutch element; control means for preventing operation of said indexing means prior to setting off of a flash, said control means comprising a control member mounted in said support and movable between a first position to disengage said one clutch element from said other clutch element and a second position in which the clutch is free to move said holder between successive positions in response to manipulation of said drive means, and biasing means for permanently urging said control member to second position; and a device for moving said control member to first position in response to detachment of said holder from said support, said device comprising a rod movable in said support between first and second positions and comprising first and second portions, resilient means for permanently urging said rod to said first position in which said first portion thereof extends into the path of the holder when the latter is to be attached to said support and in which said second portion maintains the control member in said first position thereof, said rod being movable to second position in response to attachment of the holder to said support resulting in displacement of said first portion.

13. In a photographic camera, a support; a holder having a plurality of flash bulbs and first contact means for each of said flash bulbs, said holder being detachably carried by and being movable with reference to said support between a plurality of successive positions in each of which one of said bulbs faces in a predetermined direction; a flash circuit including second contact means carried by said support and being engaged by one of said first contact means when the respective bulb faces in said predetermined direction; means for completing the flash circuit during an exposure to set off a flash by effecting discharge of the bulb facing in said predetermined direction; indexing means operative to move said holder between said successive positions; drive means including a film transporting mechanism for operating said indexing means, said indexing means comprising a clutch including a first clutch element for transmitting motion to said holder and a second clutch element receiving motion from said drive means, one of said clutch elements being movable into and from engagement with said other clutch element; control means for preventing operation of said indexing means prior to setting off of a flash, said control means comprising a control member mounted in said support and movable between a first position to disengage said one clutch element from said other clutch element and a second position in which the clutch is free to move said holder between successive positions in response to manipulation of said driven means, and biasing means for permanently urging said control member to second position; a device for moving said control member to first position in respose to detachment of said holder from said support; and blocking means for preventing double exposure of film frames, said blocking means comprising a blocking member movable between first and second positions in the first of which said blocking member prevents manipulation of said film transporting mechanism and in the second of which said blocking member prevents movement of said control member to second position so that said control member is held in first position when said holder is attached to the support and the film transporting mechanism is not blocked by said blocking member.

14. A structure as set forth in claim 13, wherein said device comprises means for releasing said control member in response to attachment of the holder to said support so that said biasing means automatically entrains the control member to second position in response to completed manipulation of said film transporting mechanism and resultant movement of said blocking member to first position.

15. In a photographic camera, a support; a holder having a plurality of flash bulbs and first contact means for each of said flash bulbs, said holder being detachably carried by and being movable with reference to said support between a pluraltiy of successive positions in each of which one of said bulbs faces in a predetermined direction; a flash circuit including second contact means carried by said support and being engaged by one of said first contact means when the respective bulb faces in said predetermined direction; means for completing the flash circuit during an exposure to set off a flash by effecting discharge of the bulb facing in said predetermined direction; indexing means operative to move said holder between said successive positions, said indexing means comprising clutch means including two clutch elements, one of said clutch elements being movable axially with reference to the other clutch element and said holder being rotatable between said successive positions thereof; drive means for operating said indexing means; control means for preventing operation of said indexing means prior to setting off of a flash, said control means comprising a control member movable in said support between a first position in which said one clutch element is held against axial movement toward said other clutch element and a second position; blocking means for preventing double exposure of film frames, said blocking means being movable to and from a blocking position in which said control member is held in said first position; and means for moving said blocking means from such blocking position in response to manipulation of said drive means to thereby permit axial movement of said one clutch element with reference to the other clutch element.

16. A structure as set forth in claim 15, wherein said clutch is a claw clutch and said drive means comprises a film transporting mechanism, said blocking means being movable to a second position in which said film transporting means is prevented from repeatedly transporting the film upon completion of an exposure.

17. A structure as set forth in claim 15, wherein said control member is a two-armed lever one arm of which is rockable by said blocking means and the other arm of which is arranged to effect movement of said one clutch element with reference to the other clutch element.

18. A structure as set forth in claim 17, wherein said control means further comprises a control cam movable with said one clutch element and said other arm of said two-armed lever is arranged to be disengaged from said control cam in response to rocking of said first arm by said blocking means while said blocking means moves from blocking position.

References Cited

UNITED STATES PATENTS

| | | | |
|---|---|---|---|
| 3,334,562 | 8/1967 | Schroder et al. | 95—31 |
| 3,353,468 | 11/1967 | Beach | 240—37 XR |
| 3,354,300 | 11/1967 | Parsons et al. | 95—11 XR |
| 3,369,468 | 2/1968 | Sapp et al. | 95—11.5 |
| 3,374,720 | 3/1968 | Harvey | 95—11.5 |

NORTON ANSHER, Primary Examiner

FED L. BRAUN, Assistant Examiner

U.S. Cl. X.R.

240—37.1